O. W. TAFT.
Attaching Hollow-Handles to Cutlery.

No. 161,295.                               Patented March 23, 1875.

WITNESSES:
A Bennemendorf
J H Scarborough

INVENTOR:
O. W. Taft
BY
ATTORNEYS.

THE GRAPHIC CO. PHOTO-LITH. 39 & 41 PARK PLACE, N.Y.

UNITED STATES PATENT OFFICE.

OWEN W. TAFT, OF NEW YORK, N. Y.

IMPROVEMENT IN ATTACHING HOLLOW HANDLES TO CUTLERY.

Specification forming part of Letters Patent No. 161,295, dated March 23, 1875; application filed March 6, 1875.

CASE B.

*To all whom it may concern:*

Be it known that I, OWEN W. TAFT, of the city, county, and State of New York, have invented a new and useful Improvement in Attaching Hollow Handles to Cutlery and other articles, of which the following is a specification:

My invention consists of attaching hollow handles, or such as have a socket in one end, of cutlery and other articles to the shank or tang of the blade, fork, or other object by means of a sheet-metal bolster, stamped, spun, or otherwise wrought into the proper shape, and receiving the handle on its exterior portion by screw-threads or otherwise, and the tang or shank inside of it, where it is fastened by solder, or by screwing into a disk fastened in the end of the bolster, or by both ways. This contrivance makes a bolster that can be made cheaper and be more easily ornamented than the solid forged bolster.

Figure 1:
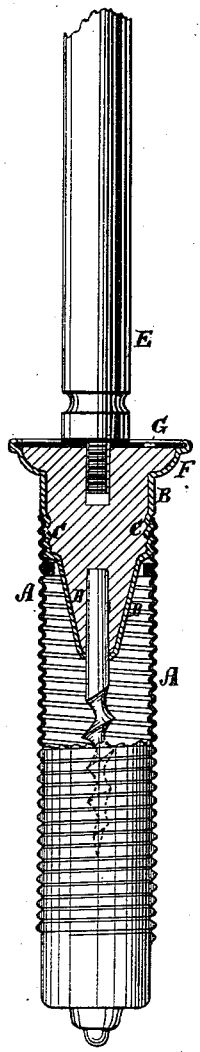
Figure 2:
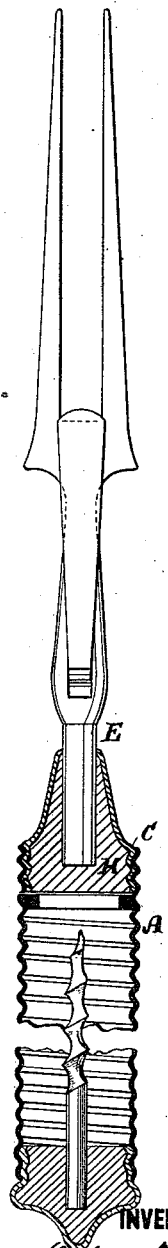

Figure 1 is a sectional elevation of a hollow handle and bolster, showing the mode of attaching the bolster by solder, and by screwing into a disk in the end of the bolster. Fig. 2 is a section, showing the tang fastened in the bolster by solder.

Similar letters of reference indicate corresponding parts.

A represents a hollow sheet-metal handle for cutlery and other articles, which it is sought to attach to the said articles in a simple, cheap, and efficient way by the use of a sheet-metal bolster, B, to which the handle is attached by screwing on a screw-threaded portion, C, or it may be slipped on a smooth portion and removably secured in any equivalent way. The bolster is contrived in the form of a deep cup, with a conical bottom portion, D, being produced, preferably, by stamping; but it may be spun. The handle will screw onto either end, and the shank of the knife or other article may be connected to either end. When the handle screws on the bottom, as in Fig. 1, and the shank E of the implement is attached to the large open end, the latter will have a flange, F, to receive a disk, G, also to make a guard for a carving-knife, and into which the shank will screw; but the handle may be connected to the large or open end and the shank to the small end, as in Fig. 2, in which case the flange F and the disk G will be dispensed with, and the solder H will be relied on to fasten it. The solder may also be used together with the disk or not, as preferred.

Other contrivances in respect of these particulars may be adopted. By solder I mean any substance to be applied by melting and pouring in or around the parts.

I propose also to have the end piece made like the bolster, to screw into the hollow handle, as shown in Fig. 2, and form the handle of a corkscrew or other useful utensil.

Having thus described my invention, I claim as new and desire to secure by Letters Patent—

The combination, with a hollow handle, of a sheet-metal bolster or end piece, removably connected by screw-threads or equivalent device, and in which a fork, steel, corkscrew, or analogous article is secured by solder or analogous material, substantially as specified.

OWEN W. TAFT.

Witnesses:
T. B. MOSHER,
C. L. TOPLIFF.